United States Patent
Kishi (10) Patent No.: US 8,046,685 B2
(45) Date of Patent: Oct. 25, 2011

(54) INFORMATION DISPLAY DEVICE IN WHICH CHANGES TO A SMALL SCREEN AREA ARE DISPLAYED ON A LARGE SCREEN AREA OF A DISPLAY SCREEN

(75) Inventor: Nobuya Kishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 533 days.

(21) Appl. No.: 12/192,180

(22) Filed: Aug. 15, 2008

(65) Prior Publication Data

US 2009/0070670 A1  Mar. 12, 2009

(30) Foreign Application Priority Data

Sep. 6, 2007  (JP) ................. 2007-230949

(51) Int. Cl.
   *G06F 3/01* (2006.01)
   *G06F 3/041* (2006.01)
   *G06F 3/048* (2006.01)
(52) U.S. Cl. ......... 715/702; 345/173; 715/781; 715/788
(58) Field of Classification Search .................. 715/702, 715/781, 788; 345/7, 9, 156, 157, 173, 178
   See application file for complete search history.

(56) References Cited

U.S. PATENT DOCUMENTS 7,109,975 B2  9/2006  Fedorak et al.
2002/0008692 A1  1/2002  Omura et al.
2003/0043114 A1  3/2003  Silfverberg et al.
2003/0107604 A1  6/2003  Ording
2004/0021643 A1  2/2004  Hoshino et al.
2005/0225540 A1  10/2005  Kawakami et al.
2006/0017709 A1  1/2006  Okano

FOREIGN PATENT DOCUMENTS

| | | |
|---|---|---|
| CN | 1549998 | 11/2004 |
| CN | 1673947 | 9/2005 |
| CN | 1901026 | 1/2007 |
| JP | 11-259237 | 9/1999 |
| JP | 2000-043484 | 2/2000 |
| JP | 2000-056747 | 2/2000 |
| JP | 2000-293310 | 10/2000 |
| JP | 2006-039686 | 2/2006 |

*Primary Examiner* — Weilun Lo
*Assistant Examiner* — Dino Kujundzic
(74) *Attorney, Agent, or Firm* — David G. Conlin; Steven M. Jensen; Edwards Angell Palmer & Dodge LLP (57) ABSTRACT

An information display device having a large display screen which enables a user to operate an object displayed at a position distant from a user operation position is provided. The information display device has the display screen with a touch sensor, and enables a remote control of the display screen through a touch operation on the small screen area which is set to display a demagnified version of an image displayed on the display screen, by shifting a touch operation position in the small screen area to a position on the display screen. Hence an operation on the display screen and that on the small screen can be executed as the operations corresponding with each other.

7 Claims, 6 Drawing Sheets

| SCREEN CLASSIFICATION | DISPLAY POSITION | SCREEN SIZE |
|---|---|---|
| LARGE SCREEN | COORDINATES OF LOWER LEFT CORNER OF SCREEN | LENGTH (Lx), HEIGHT (Ly) |
| SMALL SCREEN | COORDINATES OF LOWER LEFT CORNER OF SCREEN | LENGTH (lx), HEIGHT (ly) |

| SCREEN CLASSIFICATION | DISPLAY POSITION | SCREEN SIZE | DISPLAY/ NONDISPLAY |
|---|---|---|---|
| LARGE SCREEN | COORDINATES OF LOWER LEFT CORNER OF SCREEN (FIXED) | LENGTH ($Lx$), HEIGHT ($Ly$) | ON (FIXED) |
| SMALL SCREEN | COORDINATES OF LOWER LEFT CORNER OF SCREEN (VARIABLE) | LENGTH ($lx$), HEIGHT ($ly$) | OFF (VARIABLE) |

INFORMATION DISPLAY DEVICE IN WHICH CHANGES TO A SMALL SCREEN AREA ARE DISPLAYED ON A LARGE SCREEN AREA OF A DISPLAY SCREEN

This Non-provisional application claims priority under 35 U.S.C. §119 (a) on Patent Application No. 2007-230949 filed in JAPAN on Sep. 6, 2007, the entire contents of which are hereby incorporated herein by reference.

FIELD OF THE INVENTION

The present invention relates generally to an information display device, and, more particularly, to a technique for displaying information using a large display screen.

BACKGROUND OF THE INVENTION

Conventionally, a white board is equipped with a printing means that optically scans the contents of proceedings (image information) written on the whiteboard with such a writing material as Magic Marker (registered trademark), and that prints the obtained image information on a thermal paper. The contents of proceedings (image information) written on the whiteboard is printed on the thermal paper by using the printing means after the conference ended, and copies of the contents of proceedings are distributed to participants in the conference.

At a conference using a conventional whiteboard, the printed contents of proceedings may have to be turned to electronic data after the end of the conference, using a word processor, etc.

Japanese Laid-Open Patent Publication No. 2000-56747 discloses an electronic conference system which enables to write the contents of proceedings directly on a large display in a free format using a direct input means (e.g., touch pen), and to turn all of the contents to electronic data in order to facilitate document management, distribution of the contents of proceedings to participants, contents processing, etc., that are carried out after the end of a conference.

In a case of such an electronic conference system, it is assumed that the system is used in a conference room with a certain space, and that the display has a height within a person's reach and a length that is not so long as to be obstacle for a person to operate it.

The size of a display device, such as a liquid crystal display, however, has been increasing these days. This leads to such a problem that when a large display device is placed in a spacious place, such as a university lecture room and an international conference room, a presenter or lecturer faces trouble of not being able to reach the upper part of the display, of moving to the end of the display to write, etc., in manipulating the display device.

SUMMARY OF THE INVENTION

The object of the present invention is to provide an information display device having a large display screen which enables a user to operate an object displayed at a position distant from a user operation position.

The information display device of the present invention has a display screen with a touch sensor, and enables a remote control of the display screen through a touch operation on a small screen area which is set to display a demagnified version of an image displayed on the display screen, by shifting a touch operation position in the small screen area to a position on the display screen.

In shifting a touch operation position in the small screen area into a position on the display screen, when a drag operation in the small screen area is carried out beyond any one of the sides of the small screen area, a position shift on the display screen is carried out not to go over the side corresponding to the side beyond which the drag operation is carried out so that a touch operation on the small screen and that on the display screen correspond with each other.

The size and position of the small screen area may be set in advance, or may be reset after the initial setting.

In setting the size of the small screen area, the vertical size of the small screen area is determined to be the height from the lower side of a display area of the display screen to a given touch position, and the aspect ratio of the small screen area is determined to be identical with the aspect ratio of the display screen.

The position of the small screen area may be determined to be at the left or right corner of the display screen that is closer to a touch position, or to be near the input portion for operating the information display device.

The small screen area may be set shiftable or set variable in size, and setting of the small screen area may be canceled at will.

PREFERRED EMBODIMENTS OF THE INVENTION

Embodiments of the present invention will now be described with reference to the accompanying drawings.

First Embodiment

In a first embodiment, an information display device equipped with a large display screen having a function of an interactive whiteboard is illustrated. The interactive whiteboard is a two-dimensional surface device for displaying a computer desk top. It has a function to input an editing operation on characters and drawings written on the surface of the whiteboard by user to a computer. It also has a function to input an editing operation on objects displayed on the surface of the whiteboard (e.g., windows, characters, images, etc.) to a computer. Although it can be used as an electronic blackboard, it is more useful for an interactive computer screen with more versatile advantages. The information display device featuring the interactive whiteboard function is used for a presentation in a school or business environment, a group work, etc.

The large display screen of the first embodiment is described as a vertically elongated display screen, but may also be provided as a horizontally elongated screen.

Figure 1:
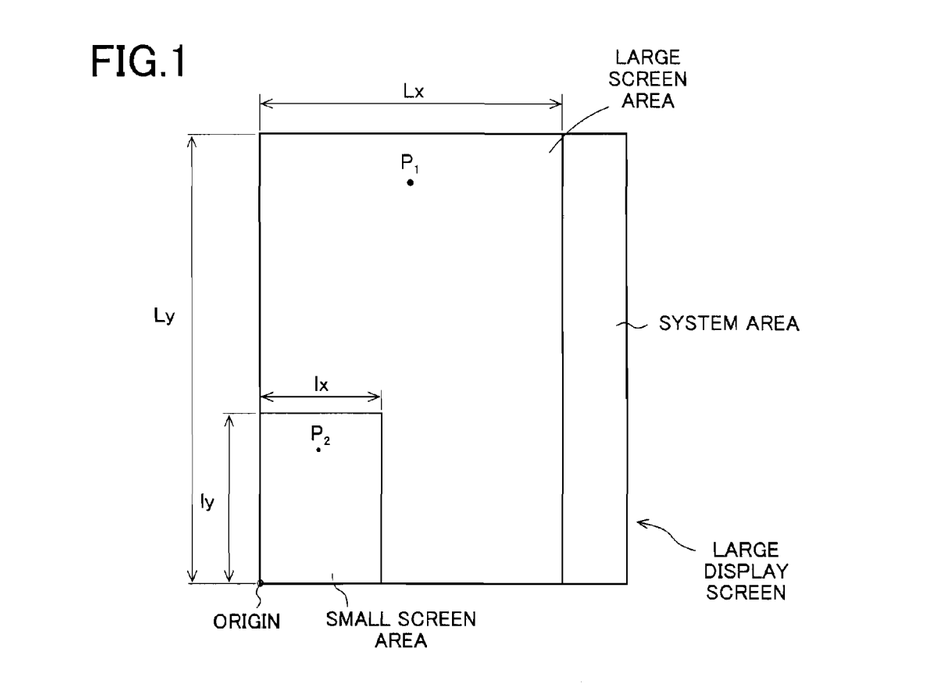
FIG. 1 is an explanatory view of coordinate axes and screen areas on a display screen.

As shown in FIG. 1, the whole area of the display screen is composed of a large screen area, a small screen area, and a system area. The whole area is represented by an XY coordinate system, where the point of the lower left corner of the screen areas is defined as the coordinate origin, the right horizontal direction is defined as the positive direction along the X axis, and the vertical upward direction is defined as the positive direction along the Y axis.

The small screen area is displayed at the lower left corner of the large screen area. The large screen has a horizontal size of Lx and a vertical size of Ly, while the small screen has a horizontal size of lx and a vertical size of ly. The size may be expressed in a pixel unit or a metric unit.

The small screen is a demagnified version of the large screen, so that every operation and display on the small screen is mirrored on the large screen, and, conversely, every operation and display on the large screen is mirrored on the small screen. If a position $P_1$ on the large screen corresponds to a position $P_2$ on the small screen, therefore, operating, displaying, or writing an object (window, character, figure, image, etc.) at the position $P_2$ on the small screen is equivalent to operating, displaying, or writing an object at the position $P_1$ on the large screen.

The system area is the area that is used for an operation menu, such as a display mode selection portion used by a control program, application program, etc., and for an operation instruction on turning on and off of a power supply, etc. The system area is displayed at the right corner of the display screen. The system area, however, may not be set in advance on the display screen and the above controls are performed by operating a button disposed outside the screen of the information display device. Further, the system area may be included in the large screen.

An outline of operation on the large display screen of the first embodiment will then be described.

Figures 2A, 2B:
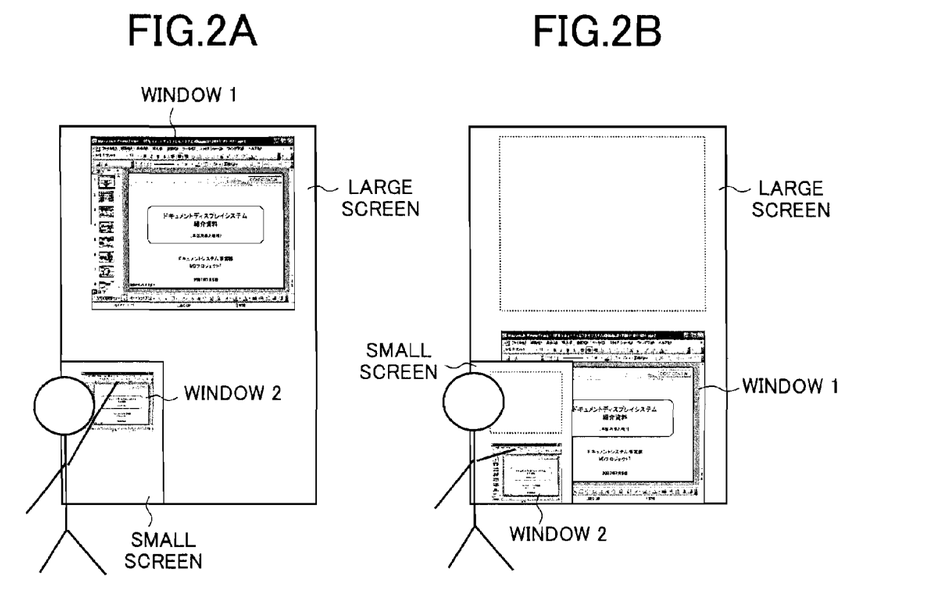
FIGS. 2A and 2B are explanatory views of an outline of operation on a large display screen.

For example, a case as shown in FIG. 2A is presumed, in which a window 1 is displayed on the upper side of the large screen and a user wants to point out a specific spot on the window 1 but a pointing means carried by the user (e.g., electronic pen, finger, bar, etc.) does not reach the spot.

The user points out a specific spot on a window 2 displayed on the small screen, the window 2 being reachable to the pointing means, to point out the specific spot on the window 1 on the large screen in remote operation.

For example, when the user wants to shift the window 1 to the lower side of the large screen, the user drags a title bar of the window 2 displayed on the small screen with the pointing means. As a result, the window 1 is shifted to the lower side of the large screen to be displayed there, as shown in FIG. 2B.

A hardware configuration of the information display device will then be described.

Figure 3:
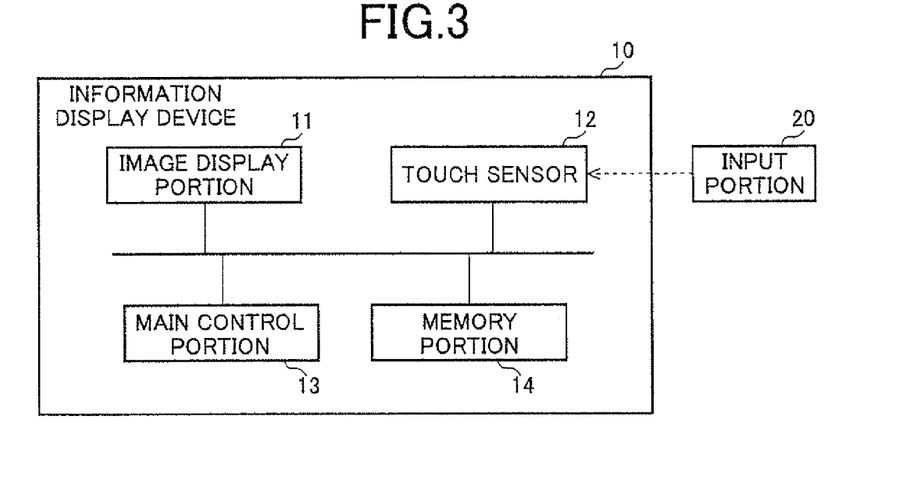
FIG. 3 is a block diagram of a hardware configuration of an information display device.

FIG. 3 is a block diagram of the hardware configuration of the information display device. In FIG. 3, the information display device 10 includes an image display portion 11, a touch sensor 12, a main control portion 13, and a memory portion 14. This information display device 10 is described as the device that is constructed by integrating together a display device composed of the image display portion 11 and the touch sensor 12, and an information processing device composed of the main control portion 13 and the memory portion 14. These devices, however, may be provided as separate devices independent of each other.

The memory portion 14 is composed of, for example, a RAM (Random Access Memory), a ROM (Read Only Memory), an HDD (Hard Disk Drive), etc. The memory portion 14 has stored therein a control program and various application programs executed by the main control portion 13 and data used for execution of the programs, and serves also as a buffer that stores therein data temporarily created during execution of the programs.

The image display portion 11 is composed of a liquid crystal display having a large display screen, etc., and displays image data resulting from execution of the control program, application program, etc., on the large display screen.

An input portion 20 is a pointing means (pointing device) that points out a position (coordinate) on the display screen when the surface of the information display device is pressure sensitive or equipped with an infrared-based position detecting system. This pointing means is provided as, for example, a human finger, pencil, electronic pen, rod, etc.

The touch sensor 12 sends the position information consisting of the contact position and contact status of the input portion 20 to the main control portion 13 by means of, for example, an infrared sensor, pressure-sensitive sensor, or capacitance-sensitive sensor.

The contact status refers to a "contact state" or a "noncontact state". The "contact state" means a state in which the input portion 20 keeps in contact with the display screen. The "noncontact state" means a state of click in which the input portion 20 has come in contact with the display screen once, a state of double click in which the input portion 20 has come in contact with the display screen twice, or a state in which the input portion 20 is separated from the display screen.

The contact position refers to the coordinates at which the input portion 20 comes in contact with the display screen, or the coordinates at which the input portion 20 breaks contact with the display screen. The contact position is expressed by the coordinate system of the display screen.

When the input portion 20 keeps in contact with the display screen, the touch sensor 12 monitors the contact status at given intervals and sends position information consisting of the contact position and contact status one after another to the main control portion 13.

The main control portion 13 is composed of, for example, a CPU (Central Processing Unit), etc., and executes the control program and various application programs stored in the memory portion 14 to control the whole of the information display device 10.

The control program is the program for controlling the whole of the information display device 10, and includes an image output portion that outputs a drawing command given by the control program or an application program and a drawing result onto the large screen and the small screen.

Figure 4:
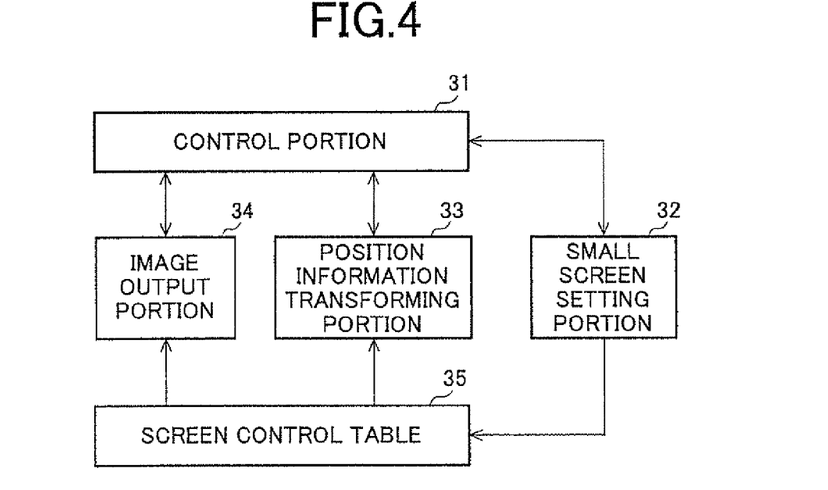
FIG. 4 is a block diagram of a functional configuration of the information display device according to a first embodiment.

A functional configuration of the information display device of the first embodiment will then be described referring to a block diagram of FIG. 4. In FIG. 4, the functional portions of the information display device include a control portion 31, a small screen setting portion 32, a position information transforming portion 33, and an image output portion 34. The information display device needs a screen control table 35 to operate the above functional portions.

The control portion 31 is configured as part of the control program, and controls the small screen setting portion 32, position information transforming portion 33, and image output portion 34 and also controls the execution of application programs.

Figure 5:
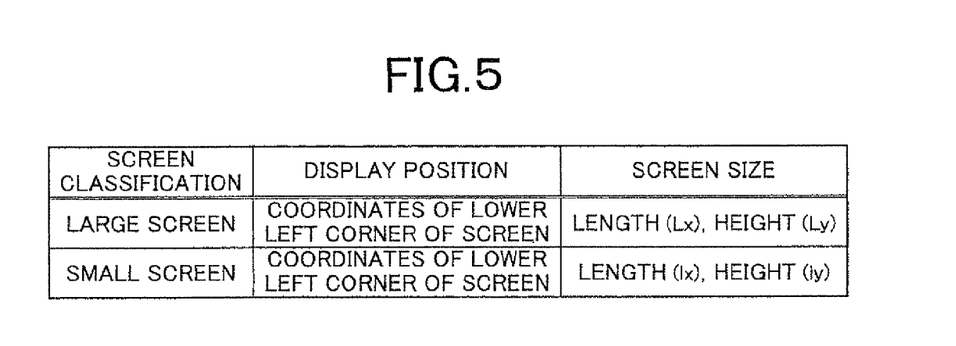
FIG. 5 depicts an example of a data structure on a screen control table of the first embodiment.

The screen control table 35 used by the image output portion 34 for controlling the large screen and small screen will be described. The screen control table 35 is recorded in the memory portion 14, and contains data items as shown in FIG. 5.

Screen classification: storing data on screen classification indicating the large screen or the small screen.

Display position: storing the coordinates that represent the position of the lower left corner of the screen classified by the screen classification. In a case of the large screen, its origin is fixed to the origin of the display screen. In a case of the small screen, however, the coordinates of its origin vary depending on preset values or user setting.

Screen size: storing the size of the screen classified by the screen classification by means of a length and a height. The large screen has a length Lx and a height Ly, and the small screen has a length lx and a height ly.

The image output portion 34 executes a drawing command given by the control program or an application program to generate image data for the large screen, and outputs the generated image data to the main buffer memory reserved in the memory portion 14.

The image data stored in the main buffer memory is then demagnified into image data that is identical in size (length and height) with the small screen, and output as image data for the small screen to a subbuffer memory reserved in the memory portion 14.

The image data for the small screen output to the subbuffer memory is written on the image data for the large screen stored in the main buffer memory so that the image data for the small screen is displayed at the display position of the small screen on the large screen, and the composed image data is written in the image memory reserved in the memory portion 14.

In this manner, when the contents of the image memory has been changed, the image output portion 34 sends the changed contents of the image memory to the image display portion 11 to display the large screen and the small screen on the large display screen.

The small screen setting portion 32 sets the size of the small screen stored in the screen control table 35 in the following manner.

A user clicks a "small screen area setting" button for display mode selection that is set on the system area.

The control portion 31 starts up the small screen setting portion 32 when determining that the user has clicked the small screen area setting button, based on the position information (contact status and contact position) received from the touch sensor 12.

The small screen setting portion 32 waits for the position information sent from the touch sensor 12, which indicates the position that the user clicked the display screen (large screen) with the input portion 20.

Figure 6A:
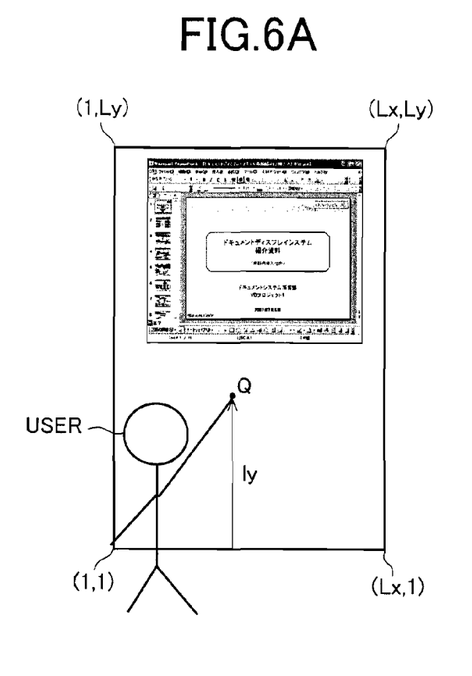
FIGS. 6A to 6C are explanatory views of setting operation for a small screen area.

The user clicks within his/her reach on the display screen (large screen) with the input portion 20. For example, as shown in FIG. 6A, the user clicks the position Q at a height ly on the large screen that is Lx in length and Ly in height.

Figure 6B:
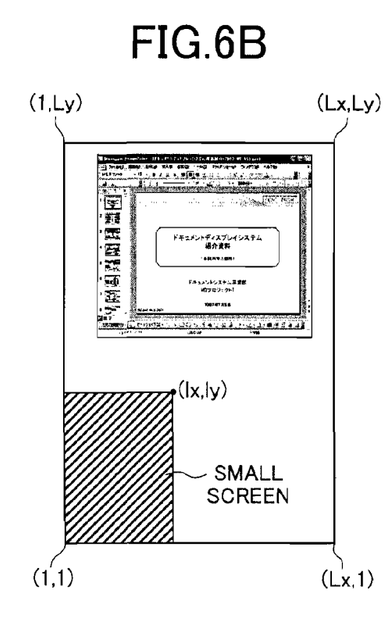
Figure 6C:
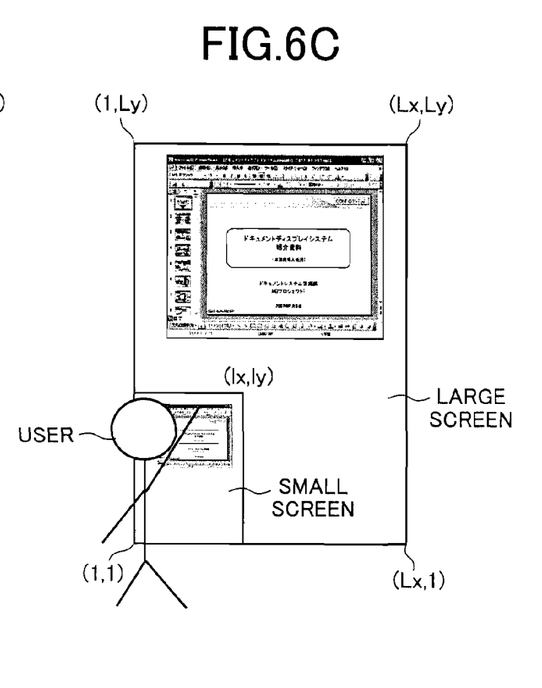

When the small screen setting portion 32 determines that the contact position information sent from the touch sensor 12 indicates the large screen and the contact status information sent from the touch sensor 12 indicates a click, the small screen setting portion 32 determines the height from the lower side of the large screen to the contact position where the click is made to be the height of the small screen, and calculates the length of the small screen from the above determined height of the small screen using the aspect ratio of the large screen. As a result, the small screen area is defined as the area that has the origin (1, 1) and the point (lx, ly) as the points of the diagonal positions, respectively (FIG. 6B). Thus, the height and length of the small screen are set on the item of "screen size" of the small screen on the screen control table 35. For example, in a case of FIG. 6A, when Lx=1080, Ly=1920, and ly=800, the length lx is calculated as follows: $1x=(Lx/Ly) \times ly=(1080/1920) \times 800=450$. The small screen setting portion 32 displays the image of the demagnified large screen on the small screen referring to the screen control table 35, and then ends the setting processing (FIG. 6C).

When the position information received from the touch sensor 12 indicates that a click is made outside the system area, the control portion 31 starts up the position information transforming portion 33.

The position information transforming portion 33 receives the position information sent from the touch sensor 12, transforms the coordinates of the contact position into the coordinates on the coordinate system of the large screen by a method to be described later, and sends the transformed coordinates and the contact status to the control portion 31.

The control portion 31 sends the contact status of the input portion 20 and the transformed coordinates of the contact position on the large screen which are sent from the position information transforming portion 33 to an application program on run. This application program is provided as, for example, an electronic blackboard system.

As a result, any coordinates pointed out by the input portion 20 are always given as coordinates on the large screen to the application program in both cases of pointing on the large screen and pointing on the small screen. Pointing operation by a user on the large screen and the corresponding pointing operation on the small screen, therefore, yields the same result.

Figure 7:
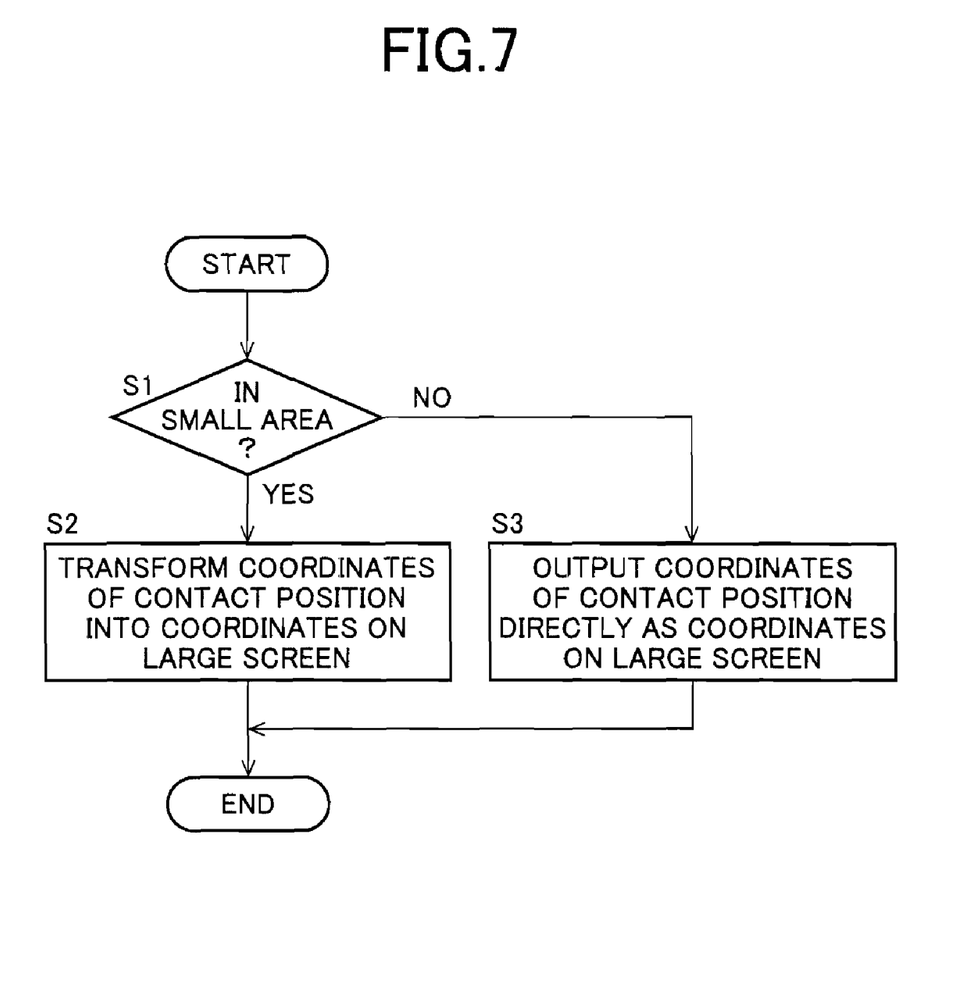
FIG. 7 is a flowchart for explaining the processing for transforming a contact position into a position on the coordinate system of a large screen.

The processing for transforming the coordinates of the contact point obtained by the touch sensor 12 into the coordinates on the coordinate system of the large screen will then be described referring to a flowchart of FIG. 7.

The following description is made on the assumption that the origin of the small screen is the same as the origin of the large screen, the coordinates of the contact position is (x, y), the length and height of the small screen are lx and ly, respectively, and the length and height of the large screen are Lx and Ly, respectively, and the transformed coordinates of the contact position on the large screen is (X, Y).

Whether the contact position (x, y) is present in the small screen area defined by the "display position" and "screen size" of the small screen listed in the screen control table 35 is checked (step S1).

When the contact position (x, y) is present in the small screen area (YES at step S1), the contact position (x, y) is transformed into the coordinates (X, Y) on the large screen using the equation described below, and the transformed coordinates (X, Y) is output to end the processing (step S2).

$$X=(Lx/lx) \times x$$

$$Y=(Ly/ly) \times y$$

When the contact position (x, y) is present in the large screen area (NO at step S1), the contact position (x, y) is directly output as the coordinates (X, Y) on the large screen, and the processing is ended (step S3).

If the input portion 20 is moved out of the small screen area keeping in contact with the display screen when the contact position of the input portion 20 is in the small screen area, the transformed coordinates obtained by the above calculation go out of the large screen area. As a result, the operation on the small screen area does not coincide with the operation on the large screen area.

Figure 8A:
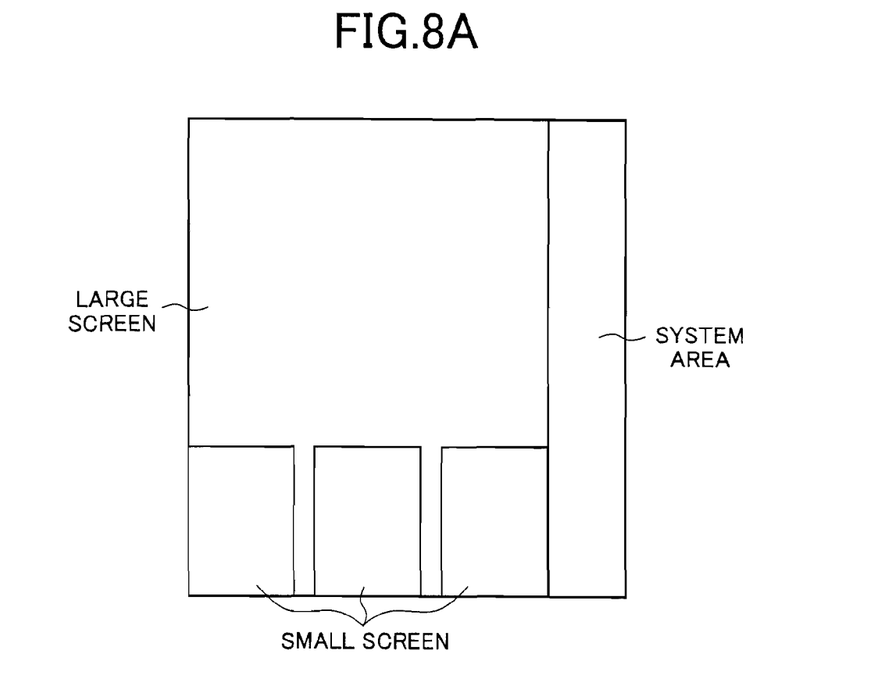
FIGS. 8A and 8B are explanatory views of the setting positions of the small screen area.
Figure 8B:
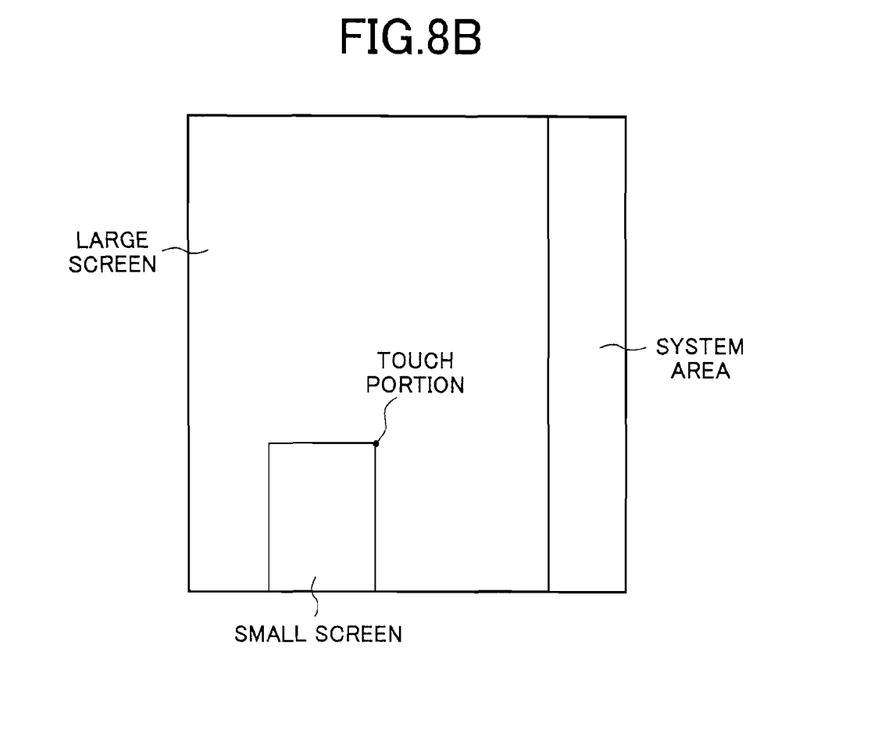

For this reason, the transformation at step S2 is carried out in the following manner to prevent the transformed coordinates from going out of the small screen area.
(1) When x<1:
X=1, Y=(Ly/ly)xy
(2) When x>lx:
X=Lx, Y=(Ly/ly)xy
(3) When y<1:
X=(Lx/lx)xx, Y=1
(4) When y>ly:
X=(Lx/lx)xx, Y=Ly Modification of First Embodiment In the first embodiment, the position of the small screen area is determined by a prescribed value set in advance (lower left corner of the large screen). The position of the small screen area, however, is not limited to this point. The prescribed value may be set by the user, and the position of the small screen area may be determined to be the lower center or lower right corner (near the system area) of the large screen (FIG. 8A), or may be determined to be the position touched by a user or the lower right corner, lower center, or lower left corner near the position the user touched (FIG. 8B).

The size of the small screen area is automatically calculated based on the touched position, but may be predetermined as the prescribed value by the user.

Second Embodiment

In the first embodiment and its modification, the small screen area is displayed without fail after being specified by the user.

When the user is able to directly operate an object displayed on the large screen, displaying the small screen is not necessary because it occurs an inconvenience that a part of the large screen may be concealed under the small screen to become invisible.

According to a second embodiment, the user is allowed to display or not to display the small screen area at will, to shift the display position of the small screen area, and to resize (magnify/demagnify) the small screen area.

Figure 9:
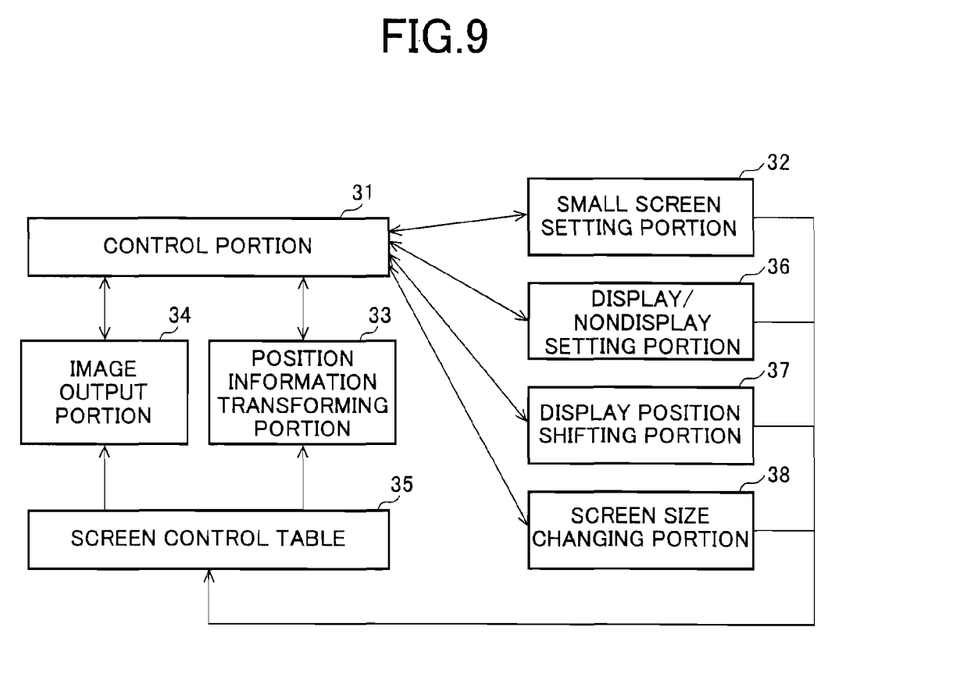
FIG. 9 is a block diagram of a functional configuration of an information display device according to a second embodiment.

FIG. 9 is a block diagram of a functional configuration of an information display device according to the second embodiment. In FIG. 9, the functional portions of the information display device include the control portion 31, the small screen setting portion 32, the position information transforming portion 33, the image output portion 34, a display/nondisplay setting portion 36, a display position shifting portion 37, and a screen size changing portion 38. The information display device needs the screen control table 35 to operate the above functional portions.

The display/nondisplay setting portion 36, display position shifting portion 37, and screen size changing portion 38 are not essential but selected as the occasion demands.

The same functional constituent elements as described in the first embodiment and its modification will be denoted by the same reference numerals, and the only altered or newly added constituent elements will be described.

Figure 10:
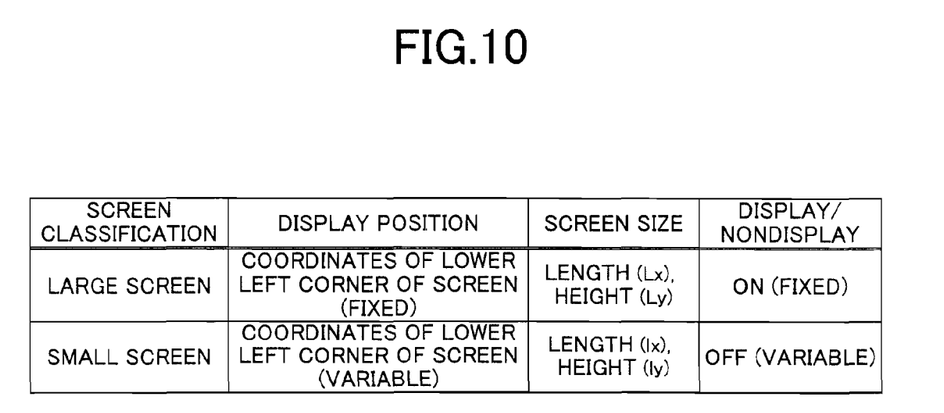
FIG. 10 depicts an example of a data structure on a screen control table of the second embodiment.

An item added to the screen control table 35 will be described referring to FIG. 10.

Screen classification: storing data on screen classification indicating the large screen or the small screen.

Display position: storing the coordinates that represent the position of the lower left corner of the screen classified by the screen classification. In a case of the large screen, its origin is fixed to the origin of the display screen. In a case of the small screen, however, the coordinates of its origin vary depending on preset values or user setting.

Screen size: storing the size of the screen classified by the screen classification by means of a length and a height. The large screen has a length Lx and a height Ly, and the small screen has a length lx and a height ly.

Display/nondisplay: storing a flag that is on when the screen classified by the screen classification is ready to display and that is off when the screen is not ready to display. In a case of the large screen, the flag is always set to ON because the large screen is always displayed. The display/nondisplay item is unnecessary when the small screen is displayed at all times. In the second embodiment, however, this data item is necessary to display or not to display the small screen in a selective manner.

The display/nondisplay setting portion 36 sets the display/nondisplay flag for the small screen area in the screen control table 35 in the following manner.

The user clicks either a "display" button or a "nondisplay" button among "small screen display" items for display mode selection in the system area.

The control portion 31 starts up the display/nondisplay setting portion 36 when determining that the user has clicked either the "display" button or "nondisplay" button among the "small screen display" items for display mode selection in the system area, based on the position information (contact status, contact position) received from the touch sensor 12.

Being started, the display/nondisplay setting portion 36 sets the "display/nondisplay" item for the small screen in the screen control table 35 to ON when determining that the user has clicked the "display" button, while sets the "display/nondisplay" item for the small screen to OFF when determining that the user has clicked the "nondisplay" button. The flag setting is then ended.

Then, when the display/nondisplay flag for the small screen area in the screen control table 35 is ON, the image output portion 34 demagnifies the image data stored in the main buffer memory into the image data that is identical in size (length and height) with the small screen, and outputs the demagnified image to the subbuffer memory reserved in the memory portion 14 as the image data for the small screen.

The image data for the small screen output to the subbuffer memory is then written on the image data for the large screen stored in the main buffer memory so that the image data for the small screen is displayed at the display position of the small screen on the large screen, and the composed image data is written in the image memory reserved in the memory portion 14.

When the display/nondisplay flag for the small screen area in the screen control table 35 is OFF, the image data stored in the main buffer memory is written in the image memory.

In this manner, when the contents of the image memory has been changed, the image output portion 34 sends the changed contents of the image memory to the image display portion 11 to display both large screen and small screen or only the large screen on the large display screen.

The display position shifting portion 37 sets a shift in the display position of the small screen listed in the screen control table 35 in the following manner.

Using the input portion 20, a user captures and drags any one of the sides of the small screen to a desired position, and releases the captured side.

The control portion 31 starts up the display position shifting portion 37 when determining that any one of four sides of the small screen area is captured, based on the position information (contact status, contact position) given at the start of dragging.

Being started, the display position shifting portion 37 keeps obtaining the position information sent from the touch sensor 12 until detecting the release of the captured side of the small screen area, during which the display position shifting portion 37 shifts and displays the dragged outline of the small screen.

When detecting the release of the captured side of the small screen area, the display position shifting portion 37 sets the coordinates of the lower left corner of the small screen displayed at present, on the item of "display position" of the small screen in the screen control table 35; and displays the image of the demagnified large screen on the small screen to end the display position shift setting.

The screen size changing portion 38 sets a change in the size of the small screen area listed in the screen control table 35 in the following manner.

Using the input portion 20, a user captures and drags any one of the corners of the small screen area until the small screen area expands to a certain size, and releases the captured corner.

The control portion 31 starts up the screen size changing portion 38 when determining that any one of four corners of the small screen is captured, based on the position information (contact status, contact position) received from the touch sensor 12.

Being started, the screen size changing portion 38 keeps obtaining the position information sent from the touch sensor 12 until detecting the release of the captured corner of the small screen area, during which the screen size changing portion 38 displays the expanding and contracting outline of the small screen in a rubber band pattern.

When detecting the release of the captured corner of the small screen area, the screen size changing portion 38 sets the height and length of the small screen displayed at present, on the item of "screen size" of the small screen in the screen control table 35. Then, an image of the demagnified large screen is displayed on the small screen to end the size change setting.

When the "display/nondisplay" flag for the small screen on the screen control table 35 is OFF, the position information transforming portion 33 outputs a contact position directly as coordinates on the large screen. When the "display/nondisplay" flag for the small screen in the screen control table 35 is ON, the position information transforming portion 33 transforms the coordinates of the contact position into the coordinates on the large screen depending on whether the contact position is on the small screen or on the large screen, in the same manner as that in the first embodiment.

When the display position of the small display area is variable as described above, coordinate transformation carried out by the position information transforming portion 33 is used in such a way that when the origin of the small screen area is $(x_0, y_0)$, $(x-x_0)$ and $(y-y_0)$ are substituted for x and y, respectively, in the equation for transformation described in the first embodiment.

In the above embodiment, display/nondisplay of the small screen is determined by a user instruction. If the user comes to be able to directly operate an object displayed on the large screen as a result of operation of the small screen, the "display/nondisplay" flag for the small screen in the screen control table 35 may be set to OFF to automatically stop displaying the small screen.

For example, when the window 1 moves to the lower side of the large screen as a result of the move of the window 2 to the lower side of the small screen to allow a user to directly operate the window 1 on the large screen, as shown in FIG. 2B, the flag for display of the small screen is automatically set to OFF.

The above embodiments are not intended to limit the present invention. It is apparent that various modifications of the embodiments are allowed within the scope of the present invention without deviating from the substance of the present invention.

The present invention offers the following effects.

A user is allowed to easily operate an object displayed at a position distant from the user's operation position on an information display device having a large display screen.

The effect of the present invention is particularly greater when the invention is applied to an information display device with a large display screen having an interactive whiteboard function.

The invention claimed is:

1. An information display device having a display screen with a touch sensor that makes it possible to operate a screen display through a touch operation on the display screen, wherein
    the information display device replaces the touch operation on a small screen area with an operation on the screen display of the display screen and enables a remote control by setting the small screen area which displays a minified version of an image displayed on the display screen, by shifting a touch operation position in the small screen area to a position on the display screen,
    a vertical size of the small screen area is determined to be a height from a lower side of a display area of the display screen to a given touch position, and a horizontal size is determined to be identical with an aspect ratio of the display screen, and
    a position shift on the display screen is carried out so as not to go over a side beyond which a drag operation is carried out when the drag operation in the small screen area is carried out beyond any one of the sides of the small screen area.

2. The information display device as defined in claim 1, wherein a size and position of the small screen area can be set in advance of the image being displayed on the display screen.

3. The information display device as defined in claim 1, wherein
    the small screen area is set at a left or right corner of the display screen that is closer to a touch position on the display screen.

4. The information display device as defined in claim 1, wherein
    the small screen area is set near an input portion for operating the information display device.

5. The information display device as defined in claim 1, wherein
    the small screen area is shiftable.

6. The information display device as defined in claim 1, wherein
    a size of the small screen area is changeable.

7. The information display device as defined in claim 1, wherein
    setting of the small screen area on the display screen is cancelable at will.

* * * * *